United States Patent
Stojkovic et al.

(10) Patent No.: US 11,685,446 B2
(45) Date of Patent: Jun. 27, 2023

(54) ELECTRIC VEHICLE STRUT TOWER TO BODY STRUCTURE INTERFACE BRACKET

(71) Applicant: Ford Global Technologies, LLC, Dearborn, MI (US)

(72) Inventors: Dragan B. Stojkovic, Taylor, MI (US); Gary E. Sheaffer, II, Wyandotte, MI (US); Steve William Gallagher, Bloomfield Hills, MI (US); Joshua Jacob Clement, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 17/152,508

(22) Filed: Jan. 19, 2021

(65) Prior Publication Data

US 2022/0227426 A1 Jul. 21, 2022

(51) Int. Cl.
*B62D 25/08* (2006.01)
*B60G 15/06* (2006.01)

(52) U.S. Cl.
CPC ......... *B62D 25/088* (2013.01); *B60G 15/068* (2013.01); *B60G 2202/312* (2013.01); *B60G 2204/128* (2013.01); *B60G 2204/43* (2013.01)

(58) Field of Classification Search
CPC .... B62D 25/088; B62D 21/11; B60G 15/068; B60G 2202/312; B60G 2204/128; B60G 2204/43
See application file for complete search history.

(56) References Cited

U.S. PATENT DOCUMENTS

| | | | |
|---|---|---|---|
| 6,135,498 A * | 10/2000 | Vlahovic | B62D 25/088 |
| | | | 280/788 |
| 9,751,564 B2 | 9/2017 | Muehlhausen et al. | |
| 10,501,124 B2 | 12/2019 | Chinzei et al. | |
| 2014/0097590 A1* | 4/2014 | Yoo | B60G 15/00 |
| | | | 280/124.155 |
| 2015/0115655 A1* | 4/2015 | Kawakami | B60G 15/067 |
| | | | 296/187.12 |
| 2016/0200361 A1* | 7/2016 | Goto | B62D 21/11 |
| | | | 296/203.01 |
| 2017/0008570 A1* | 1/2017 | Mildner | B62D 25/16 |
| 2018/0273095 A1* | 9/2018 | Chinzei | B62D 21/11 |

(Continued)

FOREIGN PATENT DOCUMENTS

| | | | | |
|---|---|---|---|---|
| CN | 105952838 A | * | 9/2016 | ............ B22D 17/00 |
| CN | 111391920 | | 7/2020 | |

(Continued)

OTHER PUBLICATIONS

Sun X, 'Machine Translation of CN 111391920 Obtained Jun. 16, 2022', Jul. 10, 2020, Entire Document. (Year: 2020).*

*Primary Examiner* — James A English
*Assistant Examiner* — Scott F. Underwood
(74) *Attorney, Agent, or Firm* — Lorne Forsythe; Hanley, Flight & Zimmerman LLC

(57) ABSTRACT

An electric vehicle frame strut tower to body structure interface bracket is disclosed. An example electric vehicle disclosed herein includes a frame, a battery pack supported by the frame, a body coupled to the frame, a strut tower coupled to the frame to support the body and absorb road surface impacts on the electric vehicle, and a strut tower interface bracket to couple the strut tower to the body.

17 Claims, 11 Drawing Sheets

(56) References Cited

U.S. PATENT DOCUMENTS

| | | | |
|---|---|---|---|
| 2020/0102021 A1* | 4/2020 | Bogachuk | ............ B62D 27/023 |
| 2021/0387494 A1* | 12/2021 | Kubota | ................ B60G 13/003 |

FOREIGN PATENT DOCUMENTS

| | | | | |
|---|---|---|---|---|
| DE | 102004058993 A1 * | 6/2006 | ........... B62D 25/088 |
| DE | 102008050297 | 5/2009 | |
| DE | 102014211086 A1 * | 12/2014 | ........... B62D 25/088 |
| DE | 102014104838 A1 * | 10/2015 | ........... B62D 25/088 |
| JP | 57084266 A * | 5/1982 | |
| JP | 3406091 B2 * | 5/2003 | |
| JP | 2005075133 | 3/2005 | |
| WO | WO-2014195269 A1 * | 12/2014 | ............. B21K 23/00 |

* cited by examiner

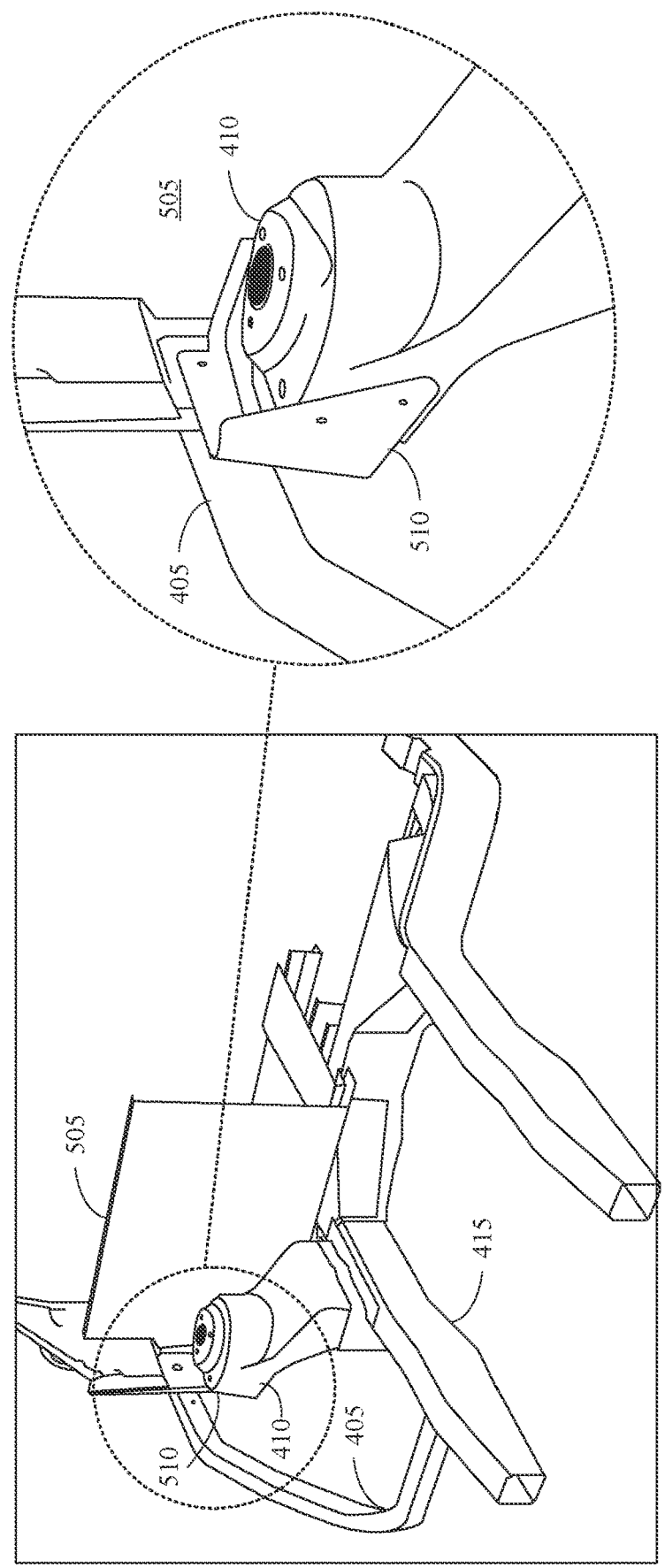

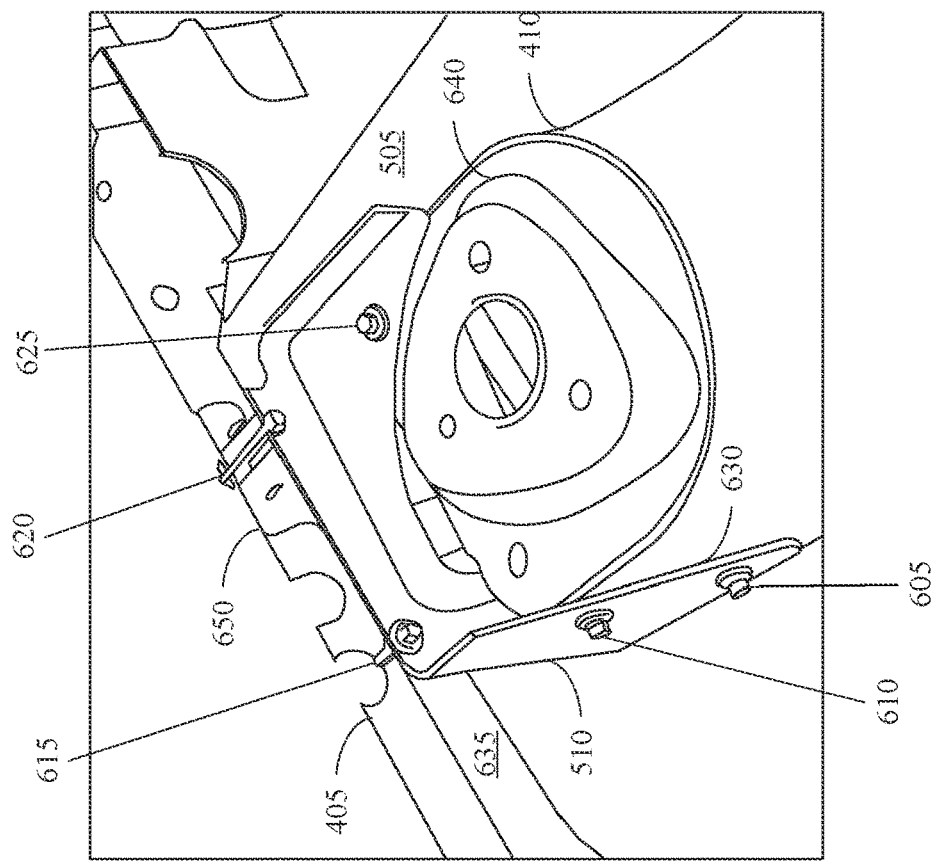
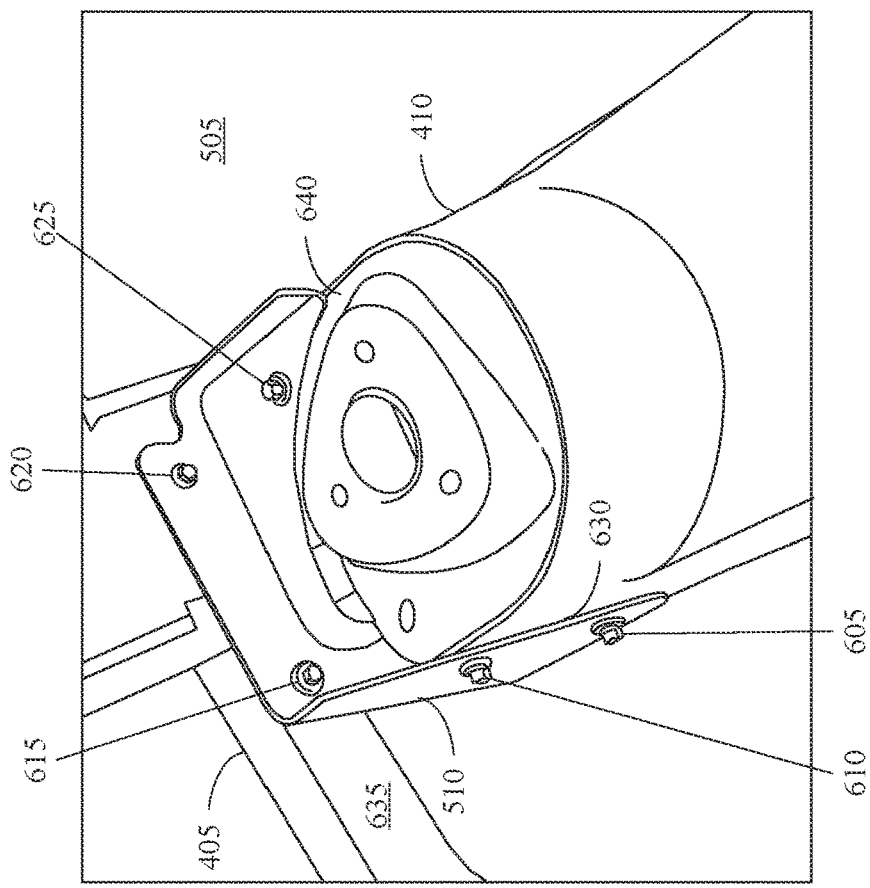

ELECTRIC VEHICLE STRUT TOWER TO BODY STRUCTURE INTERFACE BRACKET

FIELD OF THE DISCLOSURE

This disclosure relates generally to vehicle structures and, more particularly, to an electric vehicle frame strut tower to body structure interface bracket.

BACKGROUND

A vehicle frame is the main supporting structure of a vehicle. Vehicle frames can be body-on-frame constructions, where the body of the vehicle is separate from the frame, or unibody constructions, where the frame and the body are integrated. The vehicle frame supports mechanical components of the vehicle and manages the static and dynamic loads on the vehicle (e.g., the weight of passengers and cargo, torsional twisting due to uneven road surfaces, torque from a vehicle engine and/or transmission, etc.). Some vehicles include struts that are coupled to the frame to help in supporting the weight of the vehicle and providing shock absorption from ground impacts.

SUMMARY

An example electric vehicle comprising a frame, a battery pack supported by the frame, a body coupled to the frame, a strut tower coupled to the frame to support the body and absorb road surface impacts on the electric vehicle, and a strut tower interface bracket to couple the strut tower to the body.

An example electric vehicle comprising a strut tower coupled to a frame of the electric vehicle and a strut tower interface bracket to couple the strut tower to a body of the electric vehicle, the strut tower interface bracket sized to partially surround the strut tower.

An example apparatus to be coupled between a body of an electric vehicle and a strut tower, the example apparatus comprising a first interface including a first mounting feature and a second mounting feature to enable the first interface to be coupled to the strut tower, a second interface including a third mounting feature and a fourth mounting feature to enable the second interface to be coupled to the body, the second interface perpendicular to the first interface, and a third interface perpendicular to the first interface and the second interface, the third interface having a curvature to enable the third interface to be coupled to a strut cap of the strut tower.

BRIEF DESCRIPTION OF THE DRAWINGS

FIG. 5 is a first perspective view of an example strut tower interface bracket coupled to the body of the electric vehicle and the strut tower mounted to the frame of FIG. 4.

FIGS. 6A, 6B are first perspective views of the strut tower interface bracket of FIG. 5 coupled to the body of the electric vehicle and the strut tower of FIG. 4.

Figure 1:
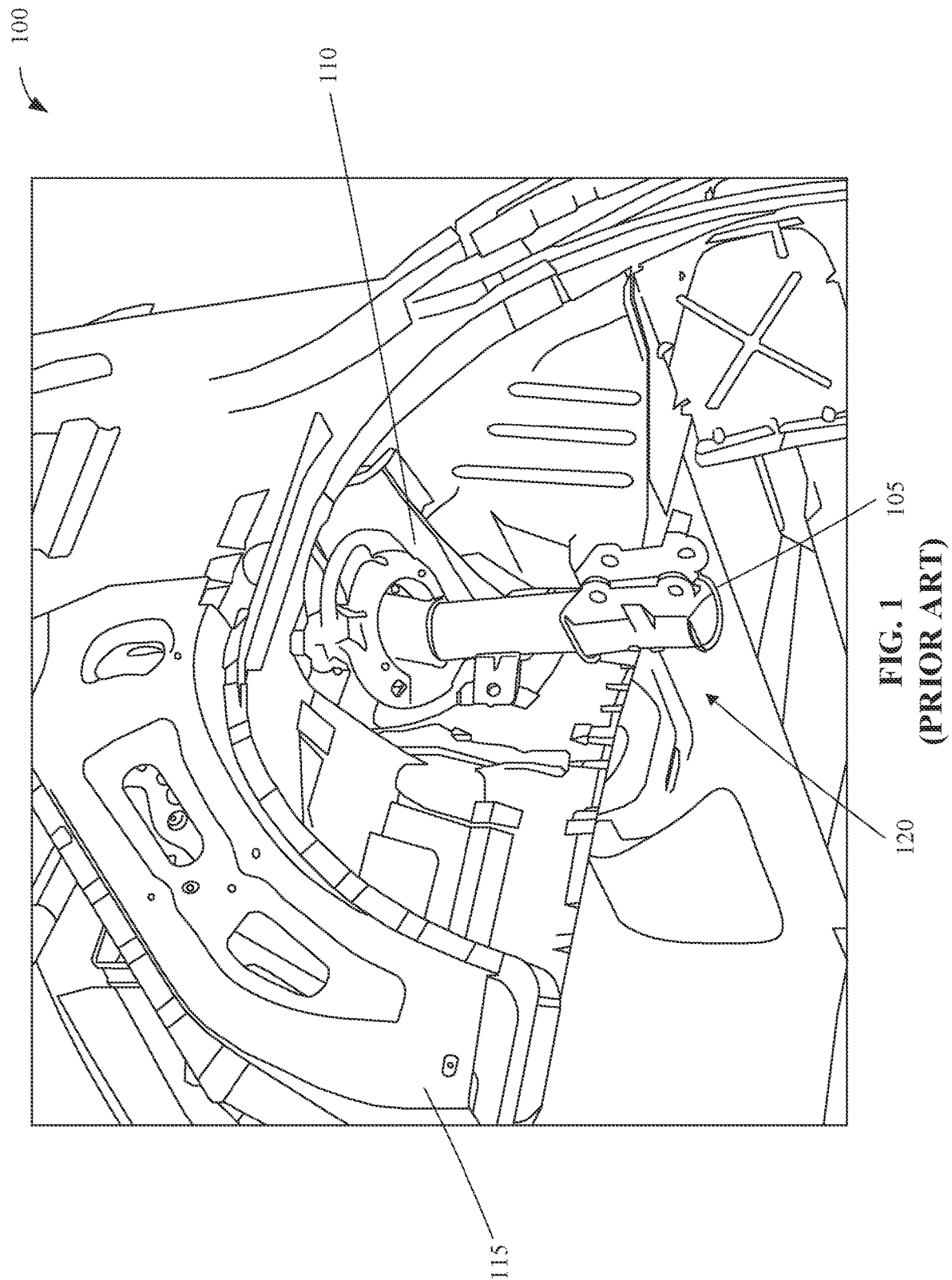
FIG. 1 illustrates an example unibody vehicle having a strut.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

DETAILED DESCRIPTION

A vehicle frame, also referred to as a chassis, supports mechanical components of the vehicle and manages the static and dynamic loads on the vehicle (e.g., the weight of passengers and cargo, torsional twisting due to uneven road surfaces, torque from a vehicle engine and/or transmission, etc.). Some vehicles include struts coupled to the frame that help in supporting the weight of the vehicle and providing shock absorption from ground impacts. A strut can include a coil spring to support the height, weight, and stability of the vehicle, and the strut can include a shock absorber to dampen vibration and absorb bumps that may be caused by irregularities on roadways. A strut in unibody vehicles (e.g., where the frame and the body of the vehicle are integrated) is typically mounted to the unibody structure. In body-on-frame vehicles (e.g., where the body of the vehicle is separate from the frame), the strut is typically attached to the frame using short long arms (SLA) suspension.

However, in recent years, many vehicles that traditionally had internal combustion engines have been converted to fully electrified vehicles and/or partially electrified vehicles. In some examples, vehicle subsystems must be redesigned to accommodate electric vehicle (EV) components (e.g., batteries, power distribution units (PDU), electric motors, etc.) while meeting safety requirements. For example, electric vehicles include battery packs attached to the frame. In such examples, the frame must be a rolling assembly before the body is decked and, thus, the strut must be a part of the rolling frame structure. To accommodate the frame mounted strut, a taller and wider strut tower is required. However, the frame mounted strut tower in the electric vehicle is cantilevered significantly away from the frame, which poses stiffness challenges for the frame of the vehicle.

Examples disclosed herein describe a joint (e.g., a strut tower interface bracket) between the frame mounted strut tower and the body of the electric vehicle after the body and frame have been joined. Examples disclosed herein allow the body to be coupled to a pre-assembled frame (or roller skate/skateboard) with a MacPherson strut front suspension. However, the strut tower cannot be cantilevered from the frame and unsupported during normal service loading conditions. In examples disclosed herein, the strut tower interface bracket allows the strut tower to be connected to the body structure after the body is coupled to the frame. In examples disclosed herein, the strut tower interface bracket provides the stiffness and strength for service loads and dimensional stability of the electric vehicle.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

FIG. 1 illustrates an example unibody vehicle 100 with a mounted strut. The unibody vehicle 100 includes an example strut 105, an example attachment location 110, and an example curved portion 115. In the illustrated example, the strut 105 supports the weight of the unibody vehicle 100 and provides shock absorption from ground impacts. In some examples, the strut 105 can include a coil spring to support the height, weight, and stability of the unibody vehicle 100, and the strut 105 can include a shock absorber to dampen vibration and absorb bumps that may be caused by irregularities on roadways. In the illustrated example, the strut 105 is typically mounted on the unibody structure at the attachment location 110. In the illustrated example of FIG. 1, the unibody vehicle 100 is structured to allow the frame and the body to be integrated. The strut 105 is mounted on the integrated frame and body of the unibody vehicle 100 at the attachment location 110. In the illustrated example, the strut 105 is mounted near the curved portion 115 of the unibody vehicle 100. In some examples, the curved portion 115 is structured to account for a placement of a wheel on the unibody vehicle 100. In the illustrated example, the strut 105 is located near the curved portion 115 to more easily dampen vibrations and absorb bumps that may be caused by irregularities on roadways.

The illustrated example of FIG. 1 further includes an example location 120 for a rolling chassis (frame) of an electric vehicle with a body-on-frame structure. In examples of an electric vehicle with a body-on-frame structure, a frame is in the location 120 instead of integrated with the body, as shown in the unibody vehicle 100. In such examples, the strut 105 is attached to the rolling frame of the location 120 instead of mounted at the attachment location 110. However, to accommodate the strut 105 mounted to the frame of an electric vehicle at the location 120, a taller and wider strut tower is required. The illustrated example of FIG. 1 illustrates the challenges of mounting the strut 105 (designed for the unibody vehicle 100) in an electric vehicle with a body-on-frame structure. Examples disclosed herein illustrate a strut tower and joining member for mounting the strut 105 in electric, body-on-frame vehicles without compromising the performance of the strut 105.

Figure 2:
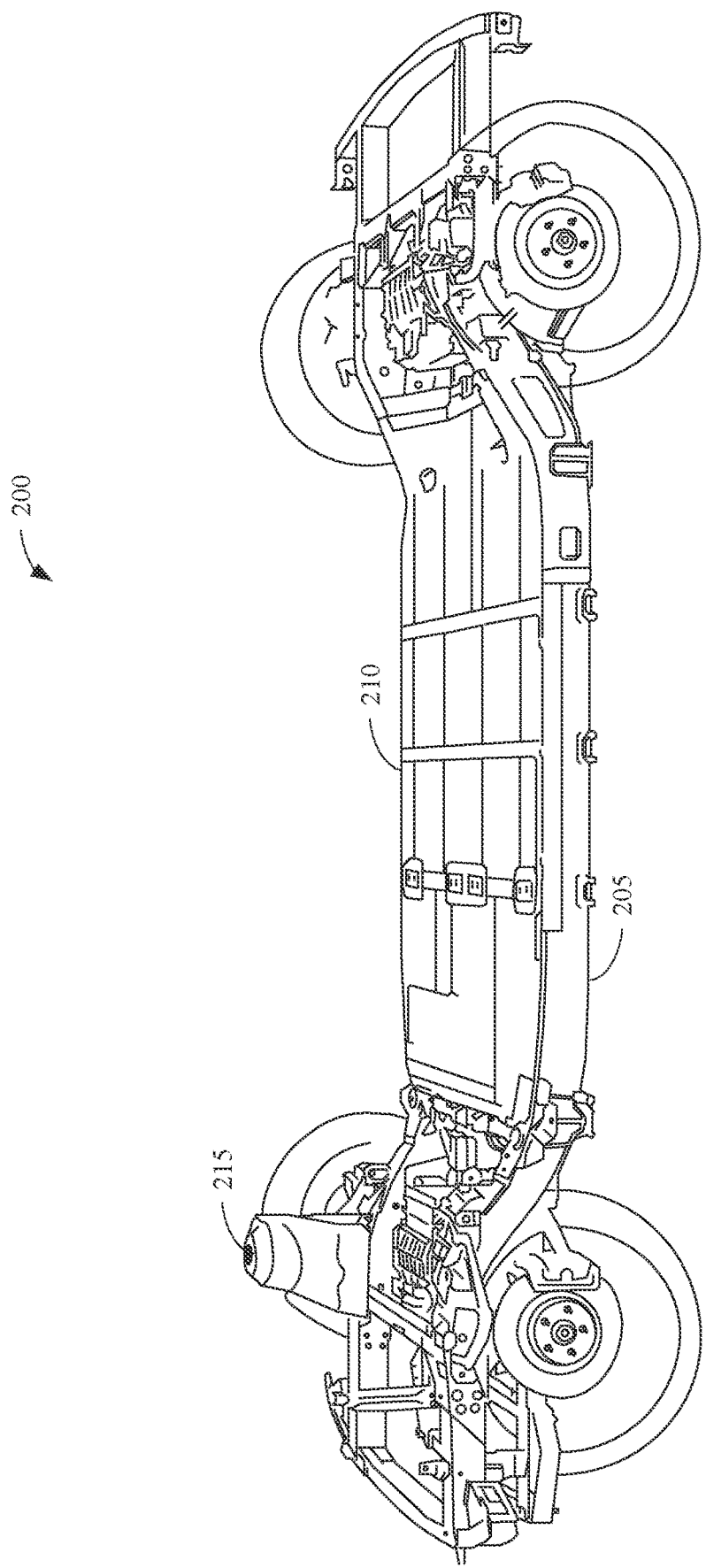
FIG. 2 illustrates an example chassis with a strut tower for an electric vehicle.

FIG. 2 illustrates an example rolling chassis 200 with a mounted strut tower for an electric vehicle. The electric vehicle chassis 200 includes an example frame 205, an example battery pack 210, and an example strut tower 215. In the illustrated example of FIG. 2, the frame 205 accommodates the attached battery pack 210 that supplies energy to the electric vehicle. In such examples, the frame 205 is structured as a rolling assembly before the body of the electric vehicle is decked. In the illustrated example, the strut tower 215 is mounted to the frame 205 to be able to support the weight and height of the body of the electric vehicle. The electric vehicle chassis 200 of FIG. 2 illustrates only one strut tower (e.g., strut tower 215) mounted to the frame 205. However, in other examples, the electric vehicle chassis 200 includes multiple strut towers mounted to the frame 205 (e.g., one strut tower mounted to the frame 205 at each location of a wheel/tire, two strut towers mount to the front end of the frame 205, etc.).

Figure 3A:
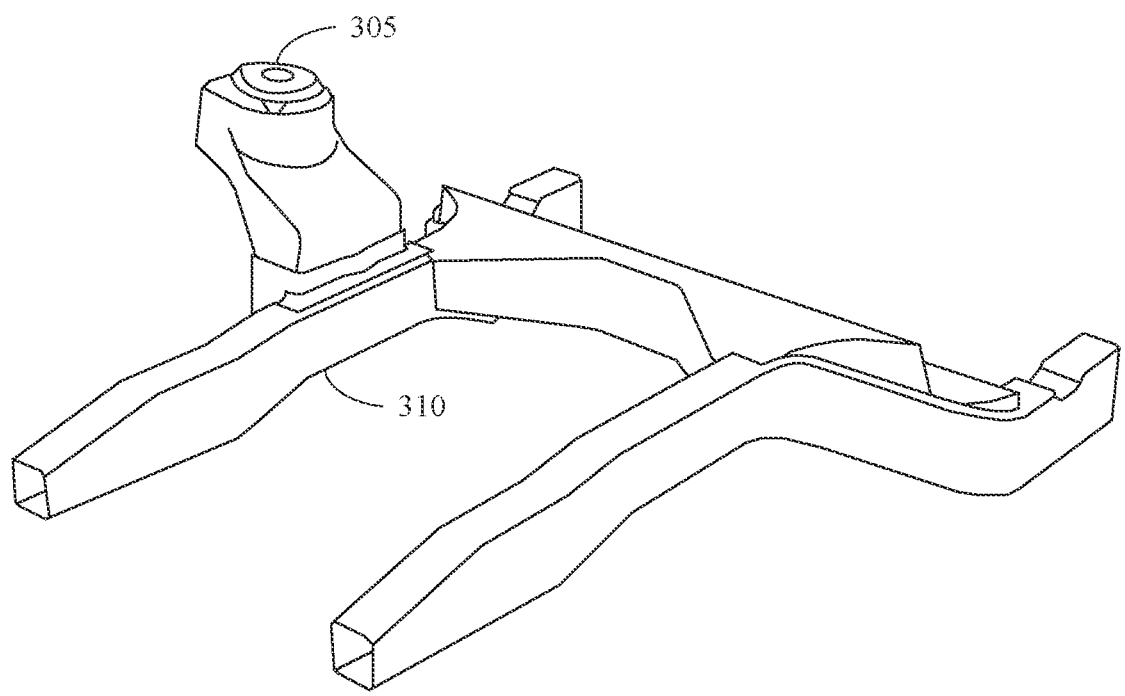
FIGS. 3A, 3B illustrate an example strut tower mounted to the frame of an electric vehicle.
Figure 3B:
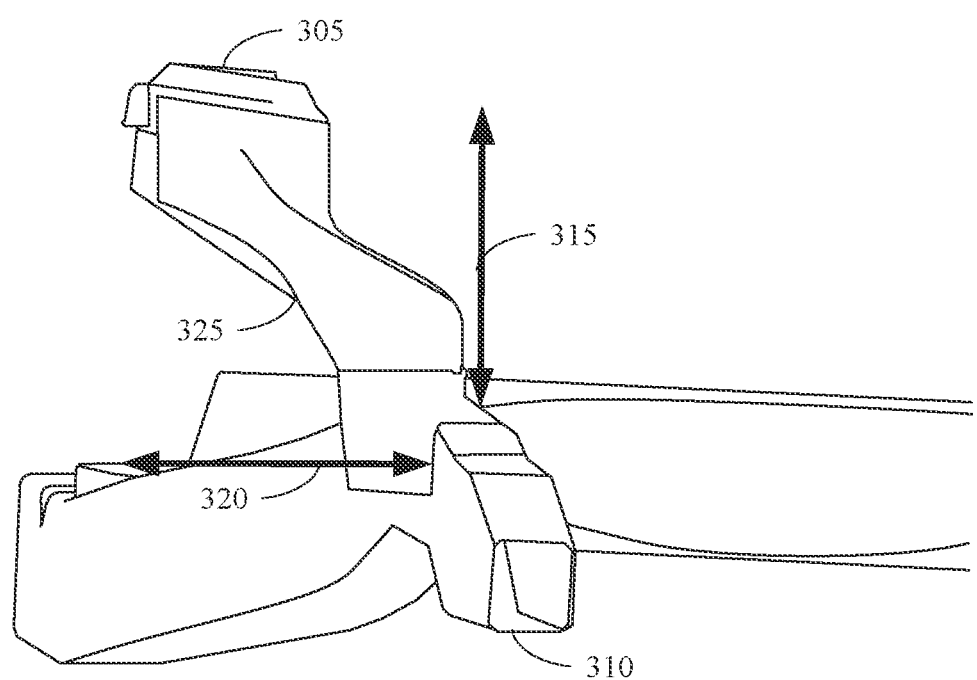

FIGS. 3A, 3B illustrate an example strut tower 305 mounted to the frame of an electric vehicle. The illustrated examples of FIGS. 3A, 3B include the example strut tower 305 and an example frame 310. FIG. 3A illustrates the strut tower 305 coupled to the frame 310 for an example electric vehicle. In the illustrated example, the strut tower 305 is higher and wider than a typical SLA suspension that is attached to the unibody structure of standard unibody vehicles. However, in some examples, the strut tower 305 is not commonly used due to the geometry of the strut tower 305 compromising the performance of the strut (e.g., to support the height, weight, and stability of the vehicle, and to dampen vibration and absorb bumps that may be caused by irregularities on roadways).

FIG. 3B illustrates example instability of the strut tower 305 when coupled to the frame 310. The illustrated example of FIG. 3B further includes example vertical stress 315 and example horizontal stress 320. In the illustrated example, the mounting of the strut tower 305 on the frame 310 creates a bending point 325 for the strut tower 305. The vertical stress 315 illustrates vertical loads that are applied to the strut tower 305 during operation (e.g., the weight of the vehicle, the weight of passengers, impacts from irregularities in roadways, etc.). The horizontal stress 320 illustrates side loads that are applied to the strut tower 305 during operation (e.g., the vehicle turning, bending of the frame 310, etc.). In the illustrated example, the strut tower 305 is unable to properly support the vertical stress 315 and the horizontal stress 320. FIG. 3B illustrates the need for an additional structural support for the strut tower 305 coupled to the frame 310.

Figure 4:
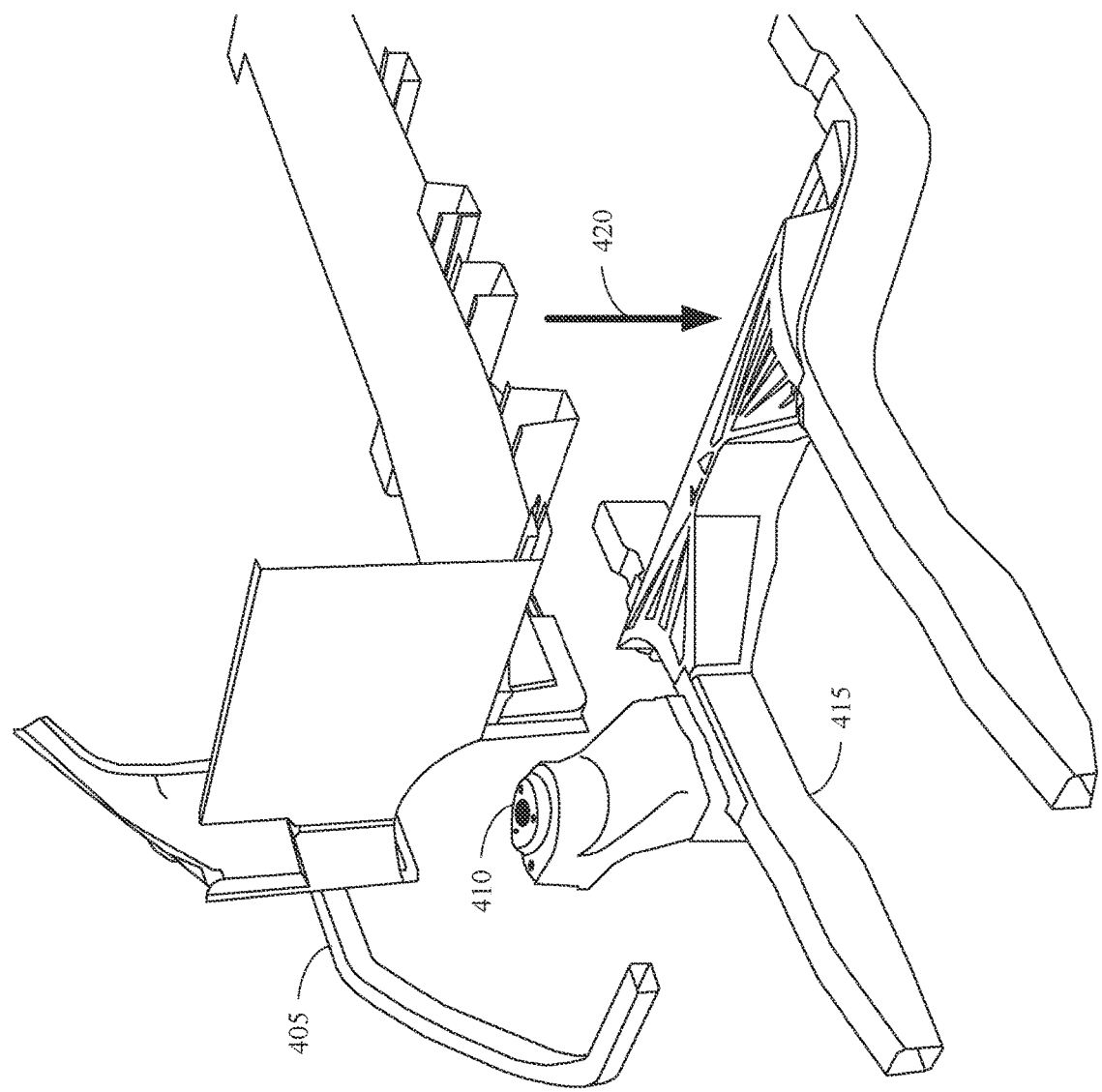
FIG. 4 illustrates an example assembly of a body of an electric vehicle coupled to an example strut tower mounted to a frame of the electric vehicle.

FIG. 4 illustrates an example assembly of a body of an electric vehicle on an example strut tower mounted to a frame of the electric vehicle. The illustrated example of FIG. 4 includes an example body 405, an example strut tower 410, an example frame 415, and an example assembly direction 420. In the illustrated example, the body 405 is separate from the frame 415 (e.g., body-on-frame structure). The frame 415 includes the suspension and wheel/tire already loaded (not illustrated in FIG. 4). The strut tower 410 is mounted to the frame 415. In the illustrated example, the strut tower 410 is unsupported (e.g., the strut tower 410 is mounted to the frame 415 without a supporting member). In some examples, the strut tower 410 is similar to the example strut tower 305 of FIGS. 3A, 3B. In such examples, the strut tower 410 is unable to support stress from loads because it is unsupported when mounted to the frame 415. In the illustrated example, the body 405 is coupled to the frame 415 based on the assembly direction 420. In the illustrated example, the body 405 is not coupled to the strut tower 410. The illustrated example of FIG. 4 illustrates the assembly of the body 405, the strut tower 410, and the frame 415 in an electric, body-on-frame vehicle. FIG. 4 illustrates the need for an additional structural support for the strut tower 410 that is mounted to the frame 415.

FIG. 5 is a first perspective view of an example strut tower interface bracket 510 coupled to the body 405 of the electric vehicle and the strut tower 410 mounted to the frame 415 of FIG. 4. The illustrated example of FIG. 5 includes an example dash panel 505. FIG. 5 illustrates the addition of the strut tower interface bracket 510 to provide the support for the strut tower 410, as described above in connection with FIG. 4. As described in connection with FIG. 4, the strut tower 410 is isolated from the body 405 even after the body 405 has been coupled to the frame 415. However, the strut tower 410 cannot be cantilevered from the frame 415 and unsupported during normal service loading conditions. In the illustrated example, the strut tower interface bracket 510 connects the strut tower 410 to the body 405, which allows the body 405 to support the strut tower 410 through the strut tower interface bracket 510. The strut tower interface bracket 510 provides the added supporting structure needed for the strut tower 410 to provide the stiffness and strength for service loads and dimensional stability of the vehicle. The strut tower interface bracket 510 is sized to partially surround the strut tower 410 while accommodating other structures such as the dash panel 505. The strut tower interface bracket 510 is described in further detail below in connection with FIGS. 6A-8H.

FIGS. 6A, 6B are first perspective views of the strut tower interface bracket 510 of FIG. 5 coupled to the body 405 of the electric vehicle and the strut tower 410 of FIG. 4. The illustrated examples of FIGS. 6A, 6B include an example first fastener 605, an example second fastener 610, an example third fastener 615, an example fourth fastener 620, and an example fifth fastener 625. In the illustrated example, the strut tower interface bracket 510 is coupled to the body 405 and the strut tower 410 after the body 405 has been coupled to the frame of the vehicle (e.g., the example frame 415 of FIGS. 4 and 4). In the illustrated example, the strut tower interface bracket 510 is coupled to the strut tower 410 and the structure of the body 405. The strut tower interface bracket 510 is coupled to a surface 630 of the strut tower 410 via the first and second fasteners 605 and 610. The strut tower interface bracket 510 is coupled to a surface 635 of the body 405 via the third and fourth fasteners 615 and 620. The strut tower interface bracket 510 is also coupled to a strut cap 640 of the strut tower 410 via the fifth fastener 625. In some examples, the fifth fastener 625 couples the strut tower interface bracket 510 to a strut cap 640 because the strut tower interface bracket 510 cannot be coupled to the backside of the strut tower 410 due to a lack of space between the strut tower 410 and the dash panel 505.

FIG. 6B illustrates a partial cross-sectional view of the body 405 and the connection between the strut tower interface bracket 510 and the body 405. In the illustrated example, the third fastener 615 and the fourth fastener 620 are inserted through the surface 635 of the body 405. In some examples, the third fastener 615 is inserted partially through the body 405. In other examples, the third fastener 615 may be inserted through the body 405 and secured on a different surface (e.g., a surface 650) of the body 405 opposite the surface 635. In some examples, the fourth fastener 620 is inserted through the body 405 (e.g., a through-bolt joint) and secured on the surface 650 of the body 405 opposite the surface 635. In other examples, the fourth fastener 620 may be inserted partially through the body 405. In the illustrated examples of FIGS. 6A, 6B, the fasteners 605, 610, 615, 620, 625 securely couple the strut tower interface bracket 510 to both the body 405 and the strut tower 410 to provide a joint between the body 405 and the strut tower 410 for increasing stiffness of the strut tower 410 in supporting the vehicle. The fasteners 605, 610, 615, 620, 625 may be rivets, screws, bolts, etc., and more or fewer fasteners may be used to couple the strut tower interface bracket 510 to the body 405.

Figure 7A:
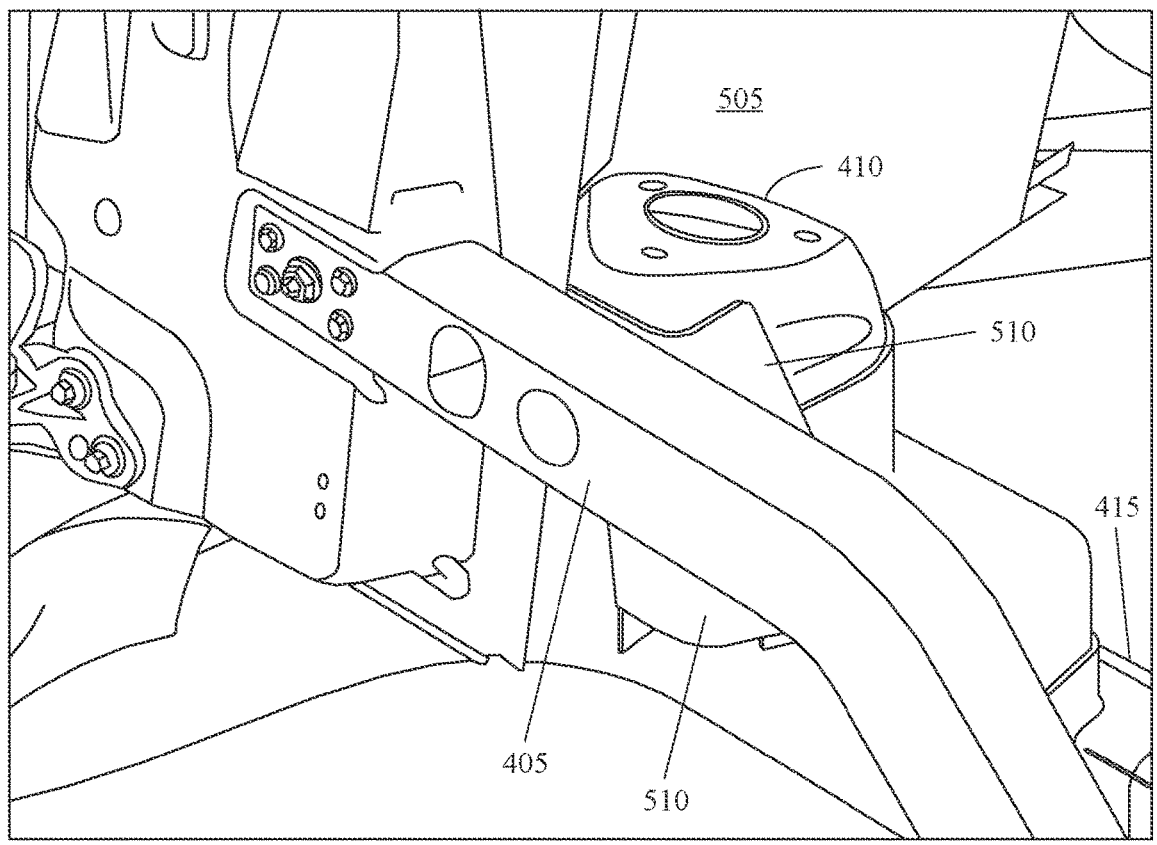
FIGS. 7A, 7B are second perspective views of the strut tower interface bracket of FIG. 5 coupled to the body of the electric vehicle and the strut tower of FIG. 4.
Figure 7B:
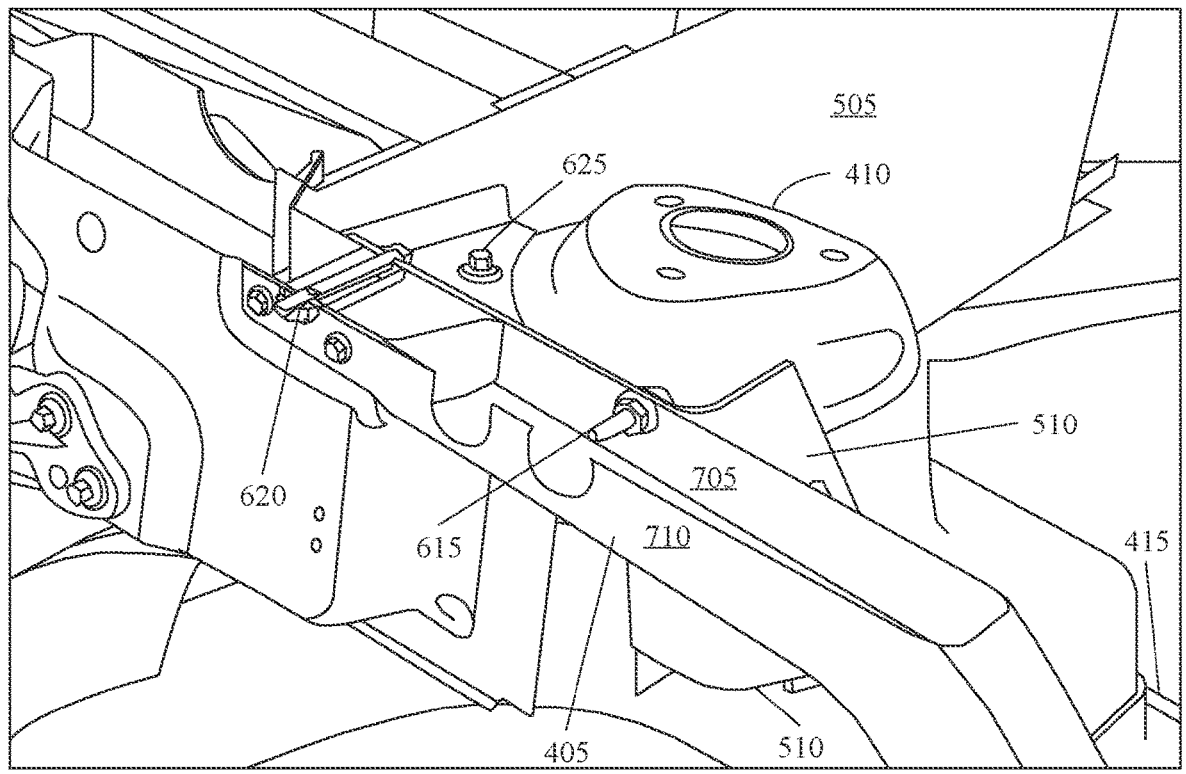

FIGS. 7A, 7B are second perspective views of the strut tower interface bracket 510 of FIG. 5 coupled to the body 405 of the electric vehicle and the strut tower 410 of FIG. 4. The Illustrated examples of FIGS. 7A, 7B include the body 405, the strut tower 410, and the frame 415 of FIG. 4 and the dash panel 505 and strut tower interface bracket 510 of FIG. 5. FIG. 7A illustrates the strut tower interface bracket 510 coupled between the body 405 and the strut tower 410. In the illustrated example of FIG. 7A, the fasteners couple the strut tower interface bracket 510 to the body 405 and the strut tower 410. FIG. 7B illustrates a partial cross-section of the body 405 in the second perspective view of the strut tower interface bracket 510 of FIG. 5 coupled to the body 405 of the electric vehicle and the strut tower 410 of FIG. 4. The illustrated example of FIG. 7B further includes the third fastener 615, the fourth fastener 620, and the fifth fastener 625 of FIG. 6. The third fastener 615 joins the strut tower interface bracket 510 to the body 405. In some examples, the third fastener 615 is coupled to an example internal surface 705 of the body 405. The fourth fastener 620 joins the strut tower interface bracket 510 to the body 405. In some examples, the fourth fastener 620 is coupled to an example outer surface 710 of the body 405. The fifth fastener 625 joins the strut tower interface bracket 510 to the strut tower 410.

Figure 8A:
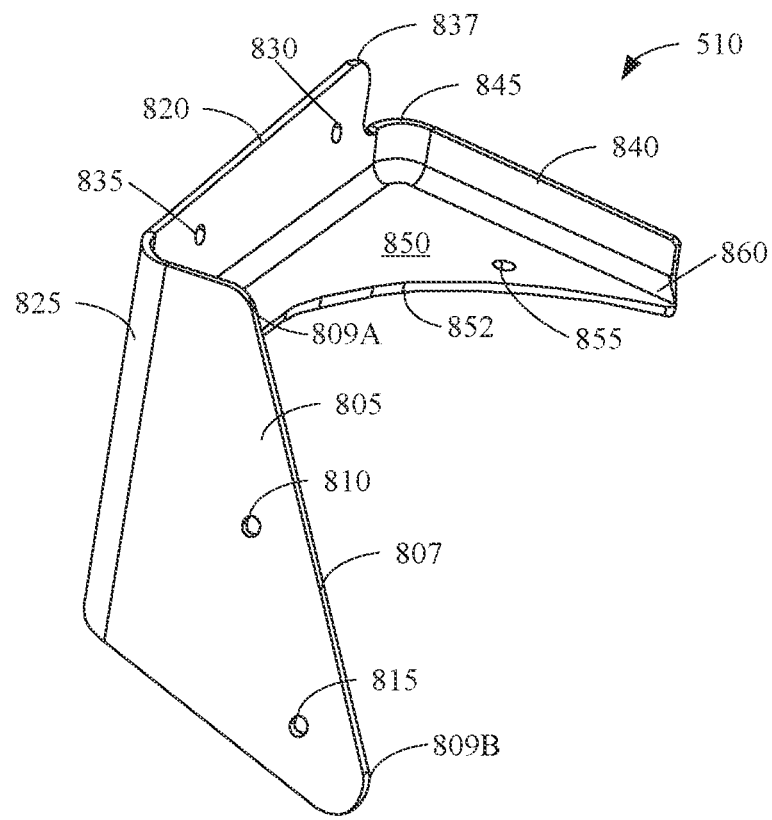
FIGS. 8A-8H are views of the strut tower interface bracket of FIGS. 5, 6A, 6B, 7A, 7B.

FIGS. 8A-8H are views of the strut tower interface bracket 510 of FIGS. 5, 6A, 6B, 7A, 7B. In the illustrated example of FIGS. 8A-8H, the strut tower interface bracket 510 includes an example tower mounting interface 805, an example first mounting feature 810, an example second mounting feature 815, an example body mounting interface 820, an example first radiused corner 825, an example third mounting feature 830, an example fourth mounting feature 835, an example gusset support plate 840, an example second radiused corner 845, an example gusset or tower cap mounting interface 850, an example fifth mounting feature 855, and an example radiused edge 860. In the illustrated examples of FIGS. 8A-8H, the strut tower interface bracket 510 is one piece of metal that is shaped via one or more stamping, bending, and/or welding operations. FIG. 8A illustrates a front-left perspective view of the strut tower interface bracket 510. In the illustrated example, the tower mounting interface 805 is a plate-like structure with a tapered edge 807. The tapered edge 807 is angled to complement the shape of the strut tower 410. The tower mounting interface 805 includes radiused corners 809A, 809B. In some examples, the radiused corners 809A, 809B reduce high stress points for the load applied to the strut tower interface bracket 510. The tower mounting interface 805 includes the first mounting feature 810 and the second mounting feature 815. The first mounting feature 810 and the second mounting feature 815 enable the tower mounting interface 805 to be mounted to the strut tower 410. In the illustrated example, the tower mounting interface 805 transitions into the body mounting interface 820 via the first radiused corner 825. The body mounting interface 820 is a plate-like structure that is shaped to facilitate the coupling of the strut tower interface bracket 510 and the body 405. The body mounting interface 820 is substantially perpendicular to the tower mounting interface 805.

In the illustrated example, the tower mounting interface 805 and the body mounting interface 820 are coupled via the first radiused corner 825. The first radiused corner 825 has a curvature that facilitates the coupling of the tower mounting interface 805 and the body mounting interface 820 while accommodating the curvature of the strut tower 410. The curvature of the first radiused corner 825 corresponds with (e.g., is congruent to, etc.) the curvature of strut tower 410. In other examples, the first radiused corner 825 can have any other suitable shape to facilitate the coupling of the tower mounting interface 805 and the body mounting interface 820 (e.g., linearly sloped, etc.). The body mounting interface 820 includes the third mounting feature 830 and the fourth mounting feature 835. The third mounting feature 830 and the fourth mounting feature 835 enable the body mounting interface 820 to be coupled to the body 405.

In the illustrated example, the body mounting interface 820 transitions into the gusset support plate 840 via the second radiused corner 845. In some examples, the body mounting interface 820 includes an L-shaped step 837 to transition to the second radiused corner 845. In some examples, the L-shaped step 837 can have any suitable angle to accommodate any interfering structures on the body 405 and/or the dash panel 505. The gusset support plate 840 is substantially parallel to the tower mounting interface 805 and substantially perpendicular to the body mounting interface 820. The gusset support plate 840 is shaped to accommodate the spacing between the strut tower 410 and the dash panel 505. In the illustrated example, the gusset support plate 840 and the body mounting interface 820 are coupled via the second radiused corner 845. The second radiused corner 845 has a curvature that facilitates the coupling of the gusset support plate 840 and the body mounting interface 820 while accommodating the curvature of the strut tower 410. The curvature of the second radiused corner 845 corresponds with (e.g., is congruent to, etc.) the curvature of strut tower 410. In other examples, the second radiused corner 845 can have any other suitable shape to facilitate the coupling of the gusset support plate 840 and the body mounting interface 820 (e.g., linearly sloped, etc.).

In the illustrated example, the tower cap mounting interface 850 is coupled between the body mounting interface 820 and the gusset support plate 840. The tower cap mounting interface 850 is substantially perpendicular to the tower mounting interface 805, the body mounting interface 820, and the gusset support plate 840. The tower cap mounting interface 850 is shaped as a gusset with a curved edge 852 to accommodate the curvature of the strut tower 410. In the illustrated example, the tower cap mounting interface 850 includes the fifth mounting feature 855. In some examples, the curved edge 852 allows for the additional mounting feature of the strut tower interface bracket 510 (e.g., the fifth mounting feature 855) while accommodating other structures that may be included on the surface of the strut cap (e.g., the strut cap 640 of FIG. 6) of the strut tower 410. The fifth mounting feature 855 enable the tower cap mounting interface 850 to be mounted to the strut cap 640.

In the illustrated example, the body mounting interface 820 and the gusset support plate 840 are coupled to the tower cap mounting interface 850 via the radiused edge 860. The radiused edge 860 has a curvature and is an L-shape to facilitate the coupling of the body mounting interface 820, gusset support plate 840, and the tower cap mounting interface 850 while accommodating the curvature of the strut tower 410. In other examples, the radiused edge 860 can have any other suitable shape to facilitate the coupling of the body mounting interface 820, gusset support plate 840, and the tower cap mounting interface 850 (e.g., linearly sloped, etc.).

In the illustrated examples of FIGS. 8A-8H the mounting features (e.g., the first mounting feature 810, the second mounting feature 815, the third mounting feature 830, the fourth mounting feature 835, and the fifth mounting feature 855) are holes to receive fasteners (e.g., bolt holes, etc.). In other examples, some or all of the mounting features can be different features (e.g., a weld surface, a threaded hole, etc.). In some examples, some of the mounting features can be absent.

Figure 8B:
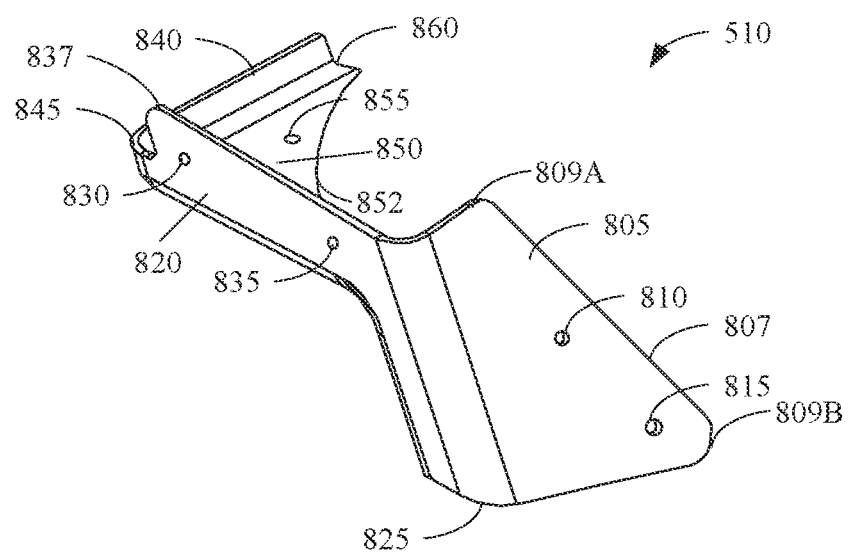
Figure 8C:
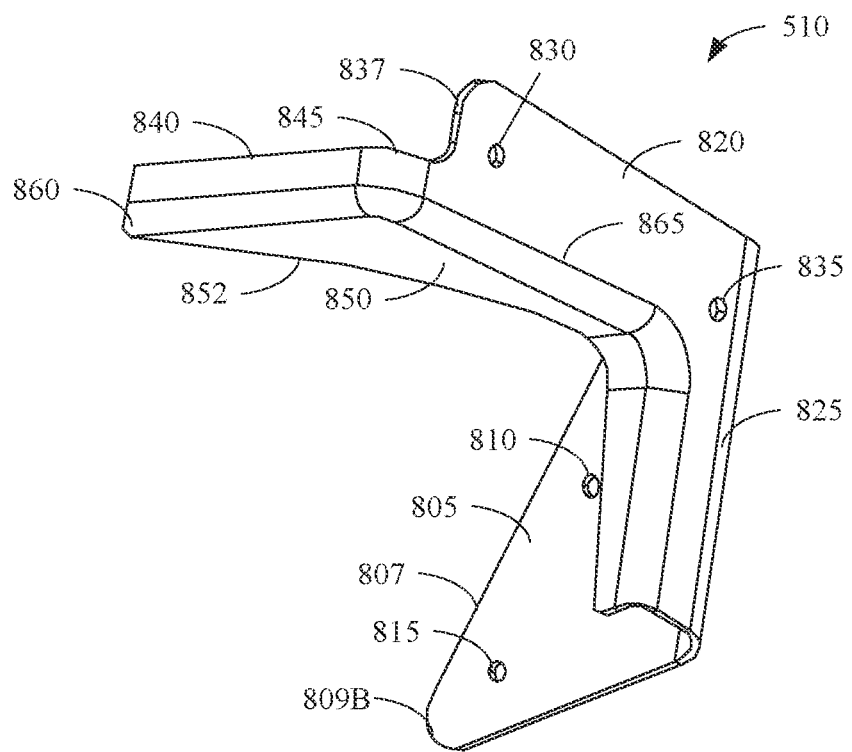

FIG. 8B illustrates a rear-left perspective view of the strut tower interface bracket 510. In the illustrated example, the body mounting interface 820 is an L-shape inverted about the x-axis. FIG. 8C illustrates a rear-right perspective view of the strut tower interface bracket 510. In the illustrated example, the tower cap mounting interface 850 and the radiused edge 860 are coupled to the length of the surface 865 of the body mounting interface 820. The tower cap mounting interface 850 and the radiused edge 860 are L-shaped similar to the shape of the body mounting interface 820. In the illustrated example, the tower cap mounting interface 850 and the radiused edge 860 have curvature that correspond with (e.g., are congruent to, etc.) the curvature of strut tower 410. In other examples, the tower cap mounting interface 850 and the radiused edge 860 can have any other suitable shapes to facilitate the coupling of strut tower interface bracket 510 to the strut tower 410 (e.g., linearly sloped, etc.).

Figure 8D:
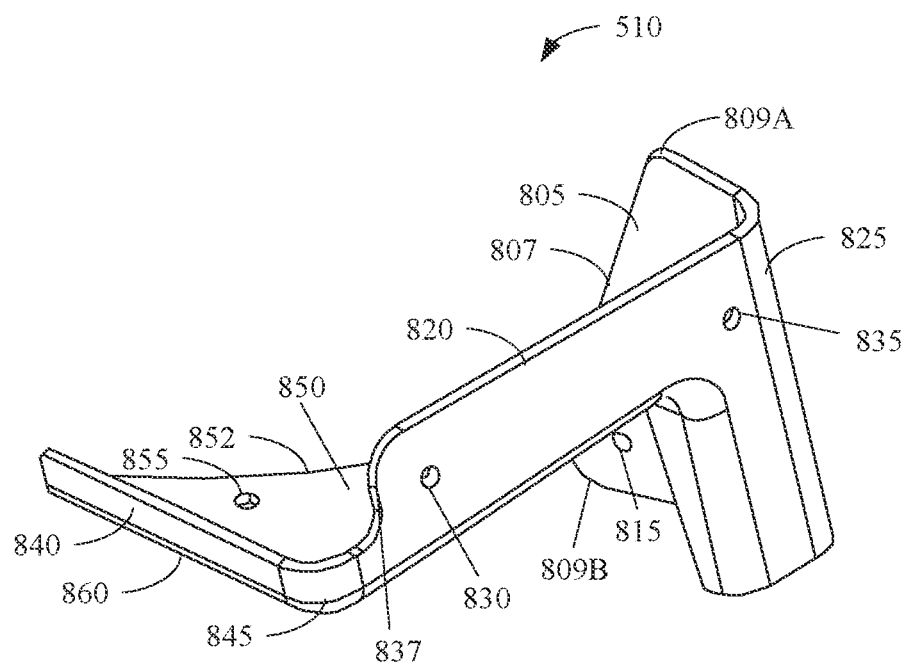
Figure 8E:
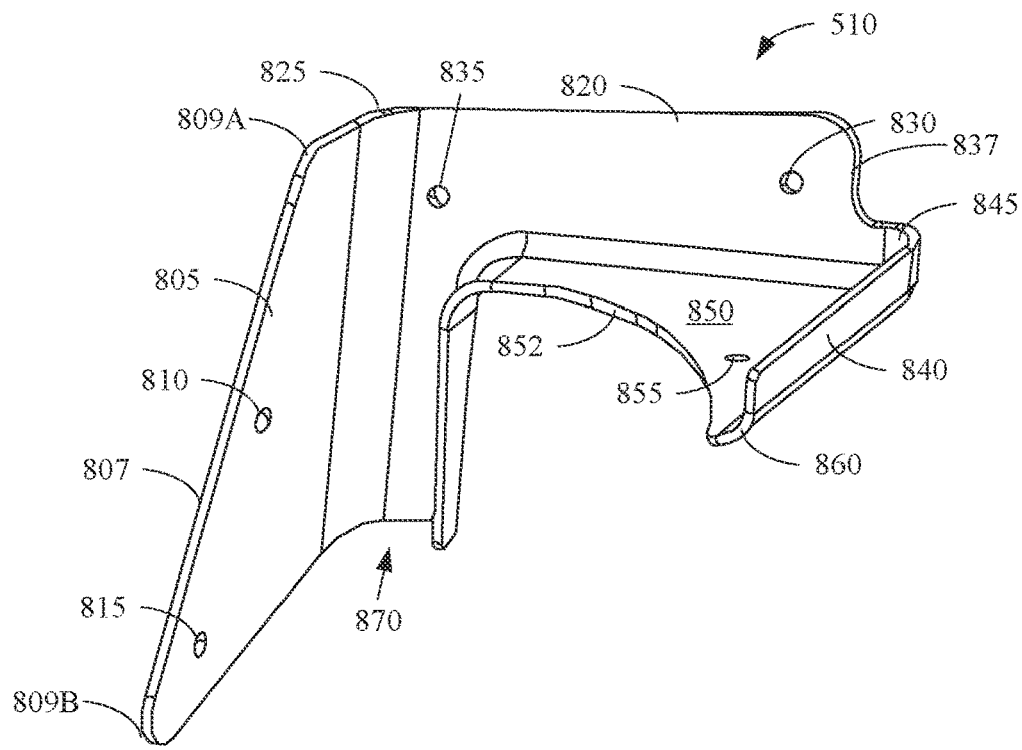

FIG. 8D illustrates a top-right perspective view of the strut tower interface bracket 510. FIG. 8E illustrates a front-right perspective view of the strut tower interface bracket 510. In the illustrated example, the tower mounting interface 805 and the first radiused corner 825 are not coupled to the tower cap mounting interface 850 or the radiused edge 860. In some examples, there is a space 870 between where the tower mounting interface 805, the body mounting interface 820, and the first radiused corner 825 are coupled and where the tower cap mounting interface 850, the radiused edge 860, and the body mounting interface 820 are coupled. In some examples, the space 870 facilitates the placement of the strut tower interface bracket 510 on the strut tower 410.

Figure 8F:
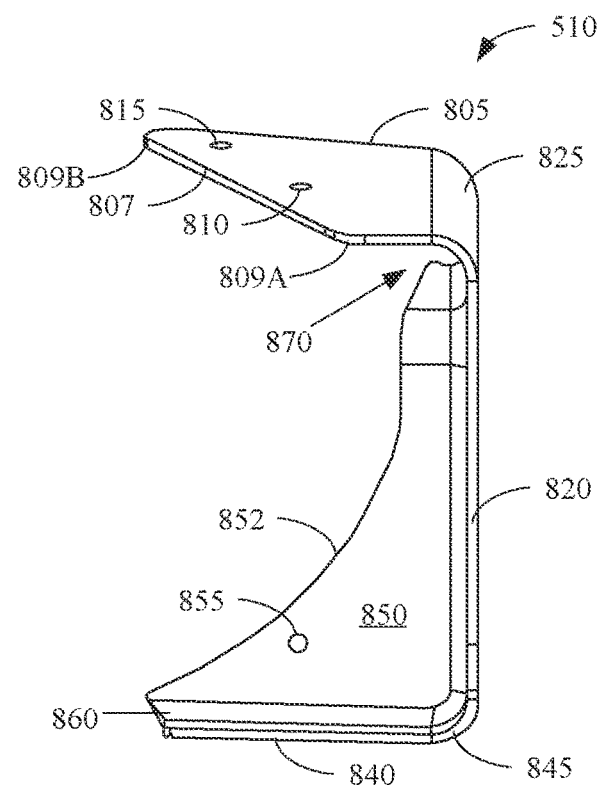
Figure 8G:
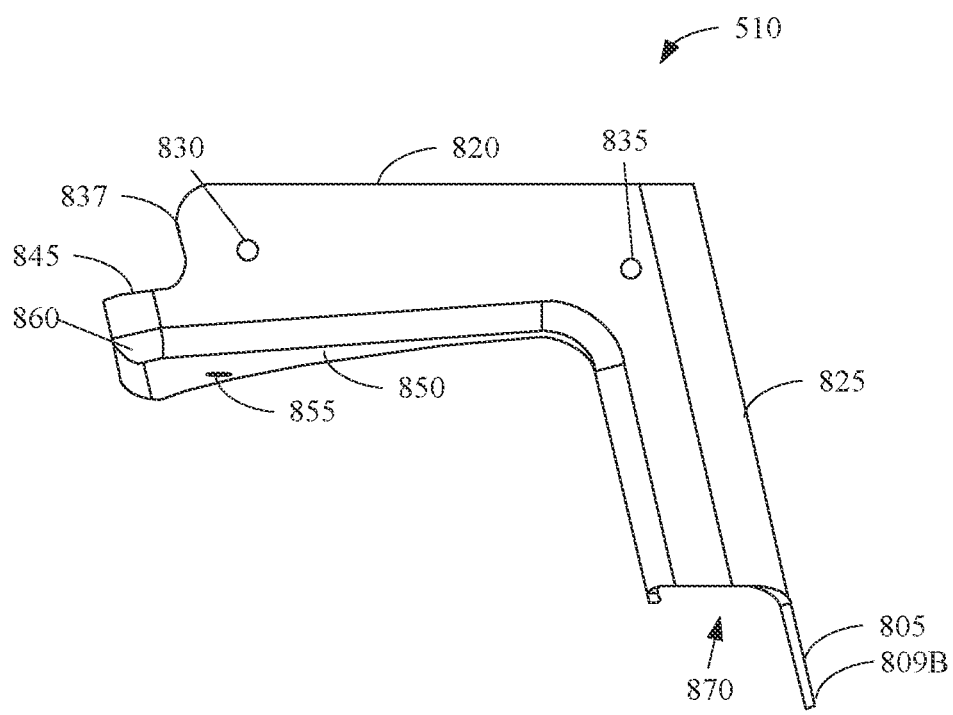
Figure 8H:
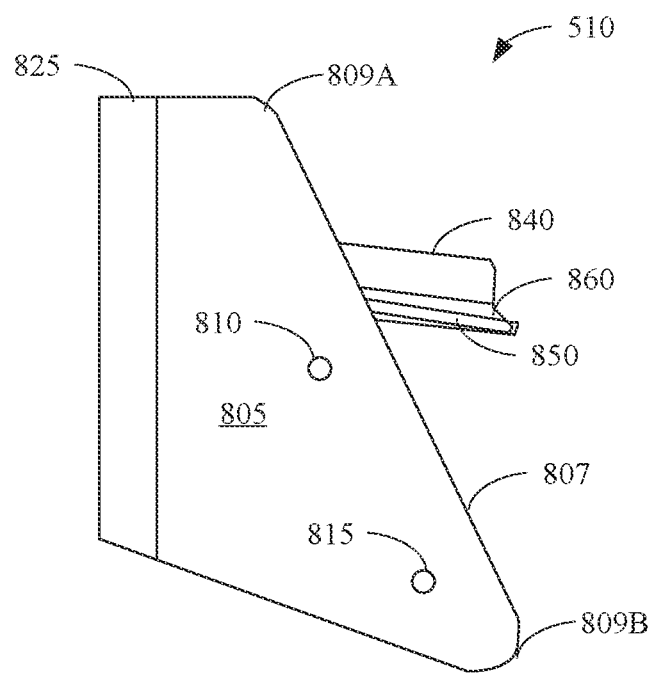

FIG. 8F illustrates a top perspective view of the strut tower interface bracket 510. FIG. 8G illustrates a rear perspective view of the strut tower interface bracket 510. In the illustrated example, tower mounting interface 805 appears to have a longer length than the body mounting interface 820 and the first radiused corner 825. FIG. 8G illustrates how the tower mounting interface 805 is angled to accommodate the shape of the strut tower 410, which causes the tower mounting interface 805 to appear longer in length in the rear perspective view. FIG. 8H illustrates a left perspective view of the strut tower interface bracket 510. In the illustrated example, the gusset support plate 840, the tower cap mounting interface 850, and the radiused edge 860 are angled similar to the tower mounting interface 805. In some examples, the gusset support plate 840, the tower cap mounting interface 850, and the radiused edge 860 are angled to facilitate the coupling of the strut tower interface bracket 510 to the strut cap (e.g., the strut cap 640) of the strut tower 410. In some examples, the angle of the gusset support plate 840, the tower cap mounting interface 850, and the radiused edge 860 correspond with (e.g., is congruent to, etc.) the angle of strut tower 410.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that describe an electric vehicle frame strut tower to body structure interface bracket. The example methods, apparatus and articles of manufacture use a strut tower interface bracket to couple the strut tower mounted on the frame to the body of the vehicle. The example methods, apparatus and articles of manufacture improve the stiffness and strength of the strut tower for service loads and dimensional stability of the electric vehicle by joining the strut tower and the body of the vehicle using the strut tower interface bracket.

Example methods, apparatus, systems, and articles of manufacture of an electric vehicle frame strut tower to body structure interface bracket are disclosed herein. Further examples and combinations thereof include the following:

Example 1 includes an electric vehicle comprising a frame, a battery pack supported by the frame, a body coupled to the frame, a strut tower coupled to the frame to support the body and absorb road surface impacts on the electric vehicle, and a strut tower interface bracket to couple the strut tower to the body.

Example 2 includes the electric vehicle of example 1, wherein the strut tower interface bracket provides stiffness to the electric vehicle for service loading.

Example 3 includes the electric vehicle of example 1, wherein the strut tower interface bracket is coupled to the body via fasteners.

Example 4 includes the electric vehicle of example 1, wherein the strut tower interface bracket is coupled to a first surface of the strut tower and a second surface of the strut tower via fasteners.

Example 5 includes the electric vehicle of example 4, wherein the first surface of the strut tower is a strut cap.

Example 6 includes an electric vehicle comprising a strut tower coupled to a frame of the electric vehicle, and a strut tower interface bracket to couple the strut tower to a body of the electric vehicle, the strut tower interface bracket sized to partially surround the strut tower.

Example 7 includes the electric vehicle of example 6, wherein a surface of the strut tower interface bracket is coupled to the body via a first bolt and a second bolt, the first bolt and the second bolt to create respective bolt joints.

Example 8 includes the electric vehicle of example 6, wherein a first surface of the strut tower interface bracket is coupled to a first surface of the strut tower via a first bolt and a second bolt.

Example 9 includes the electric vehicle of example 8, wherein a second surface of the strut tower interface bracket is coupled to a second surface of the strut tower via a third bolt, the second surface of the strut tower interface bracket different from the first surface of the strut tower interface bracket.

Example 10 includes the electric vehicle of example 9, wherein the second surface of the strut tower is a top surface of the strut tower.

Example 11 includes an apparatus to be coupled between a body of an electric vehicle and a strut tower, the apparatus comprising a first interface including a first mounting feature and a second mounting feature to enable the first interface to be coupled to the strut tower, a second interface including a third mounting feature and a fourth mounting feature to enable the second interface to be coupled to the body, the second interface perpendicular to the first interface, and a third interface perpendicular to the first interface and the second interface, the third interface having a curvature to enable the third interface to be coupled to a strut cap of the strut tower.

Example 12 includes the apparatus of example 11, wherein the third interface includes a fifth mounting feature to allow the third interface to be coupled to the strut cap of the strut tower.

Example 13 includes the apparatus of example 12, wherein the first mounting feature, the second mounting feature, the third mounting feature, the fourth mounting feature, and the fifth mounting feature are holes to receive fasteners.

Example 14 includes the apparatus of example 11, further including a radiused corner to couple the first interface and the second interface, the radiused corner curved to the strut tower, and a radiused edge to couple the second interface and the third interface, the radiused edge curved to the strut tower.

Example 15 includes the apparatus of example 11, wherein the first interface includes a tapered edge to enable the first interface to be coupled to the strut tower.

Example 16 includes the apparatus of example 11, wherein the third interface is angled to enable the third interface to be coupled to the strut cap of the strut tower.

Example 17 includes the apparatus of example 12, wherein the third interface is a gusset shape to allow for the fifth mounting feature without interfering with structures of the strut cap of the strut tower.

Example 18 includes the apparatus of example 11, wherein the second interface is a L-shape inverted on an x-axis.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An electric vehicle comprising:
    a frame;
    a battery pack supported by the frame;
    a body coupled to the frame;
    a strut tower coupled to the frame to support the body and absorb road surface impacts on the electric vehicle; and
    a strut tower interface bracket to couple the strut tower to the body, the strut tower interface bracket including:
        a first interface including a first mounting feature and a second mounting feature to enable the first interface to be coupled to the strut tower, the first interface including a tapered edge to enable the first interface to be coupled to the strut tower;
        a second interface including a third mounting feature and a fourth mounting feature to enable the second interface to be coupled to the body, the second interface perpendicular to the first interface; and
        a third interface perpendicular to the first interface and the second interface, the third interface having a curvature to enable the third interface to be coupled to a strut cap of the strut tower.

2. The electric vehicle of claim 1, wherein the strut tower interface bracket provides stiffness to the electric vehicle for service loading.

3. The electric vehicle of claim 1, wherein the strut tower interface bracket is coupled to the body via fasteners.

4. The electric vehicle of claim 1, wherein the strut tower interface bracket is coupled to a first surface of the strut tower and a second surface of the strut tower via fasteners.

5. The electric vehicle of claim 4, wherein the first surface of the strut tower is disposed on the strut cap.

6. An electric vehicle comprising:
    a strut tower coupled to a frame of the electric vehicle; and
    a strut tower interface bracket to couple the strut tower to a body of the electric vehicle, the strut tower interface bracket sized to partially surround the strut tower, the strut tower interface bracket including:
        a first interface including a first mounting feature and a second mounting feature to enable the first interface to be coupled to the strut tower, the first interface including a tapered edge to enable the first interface to be coupled to the strut tower;
        a second interface including a third mounting feature and a fourth mounting feature to enable the second interface to be coupled to the body, the second interface perpendicular to the first interface; and
        a third interface perpendicular to the first interface and the second interface, the third interface having a curvature to enable the third interface to be coupled to a strut cap of the strut tower.

7. The electric vehicle of claim 6, wherein a surface of the strut tower interface bracket is coupled to the body via a first bolt and a second bolt, the first bolt and the second bolt to create respective bolt joints.

8. The electric vehicle of claim 6, wherein the first interface is coupled to a first surface of the strut tower via a first bolt and a second bolt.

9. The electric vehicle of claim 8, wherein the third interface is coupled to a second surface of the strut tower via a third bolt, the second surface of the strut tower interface bracket different from the first surface of the strut tower interface bracket.

10. The electric vehicle of claim 9, wherein the second surface of the strut tower is a top surface of the strut tower.

11. An apparatus to be coupled between a body of an electric vehicle and a strut tower, the apparatus comprising:
    a first interface including a first mounting feature and a second mounting feature to enable the first interface to be coupled to the strut tower, the first interface including a tapered edge to enable the first interface to be coupled to the strut tower;
    a second interface including a third mounting feature and a fourth mounting feature to enable the second interface to be coupled to the body, the second interface perpendicular to the first interface; and
    a third interface perpendicular to the first interface and the second interface, the third interface having a curvature to enable the third interface to be coupled to a strut cap of the strut tower.

12. The apparatus of claim 11, wherein the third interface includes a fifth mounting feature to allow the third interface to be coupled to the strut cap of the strut tower.

13. The apparatus of claim 12, wherein the first mounting feature, the second mounting feature, the third mounting feature, the fourth mounting feature, and the fifth mounting feature are holes to receive fasteners.

14. The apparatus of claim 12, wherein the third interface is a gusset shape to allow for the fifth mounting feature without interfering with structures of the strut cap of the strut tower.

15. The apparatus of claim 11, further including:
    a radiused corner to couple the first interface and the second interface, the radiused corner curved to the strut tower; and
    a radiused edge to couple the second interface and the third interface, the radiused edge curved to the strut tower.

16. The apparatus of claim 11, wherein the third interface is angled to enable the third interface to be coupled to the strut cap of the strut tower.

17. The apparatus of claim 11, wherein the second interface is an L-shape inverted on an x-axis.

* * * * *